United States Patent
Das et al.

(10) Patent No.: US 10,084,551 B2
(45) Date of Patent: Sep. 25, 2018

(54) GENERIC NETWORK INFRASTRUCTURE FOR NANO-COMMUNICATION

(71) Applicant: International Business Machines Corporation, Armonk, NY (US)

(72) Inventors: Sushovan Das, Kolkata (IN); Soumallya Chatterjee, Kolkata (IN); Amitava Mukherjee, Kolkata (IN); Mrinal K. Naskar, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/440,099

(22) Filed: Feb. 23, 2017

(65) Prior Publication Data
US 2018/0241481 A1    Aug. 23, 2018

(51) Int. Cl.
*H04B 7/00* (2006.01)
*H04B 10/90* (2013.01)
*H04B 13/00* (2006.01)

(52) U.S. Cl.
CPC .......... *H04B 10/90* (2013.01); *H04B 13/005* (2013.01)

(58) Field of Classification Search
CPC ................................. H04B 13/00; B82Y 10/00
USPC .................................................. 455/40, 66.1
See application file for complete search history.

(56) References Cited

U.S. PATENT DOCUMENTS

| 8,209,127 | B2* | 6/2012 | Moritani | H04B 13/00 435/6.1 |
| 8,315,807 | B2* | 11/2012 | Hiyama | H04B 13/00 435/6.1 |
| 8,407,009 | B2* | 3/2013 | Hiyama | B82Y 10/00 435/6.1 |
| 9,621,283 | B1* | 4/2017 | Shin | H04B 13/00 |

OTHER PUBLICATIONS

Tadashi Nakano, Tatsuya Suda, Michael Moore, Ryota Egashira, Akihiro Enomoto, and Kayo Arima, "Molecular Communication for Nanomachines Using Intercellular Calcium Signaling", Proceedings of 2005 5th IEEE Conference on Nanotechnology, Nagoya, Japan, Jul. 2005, 4 pages.
R. E. Dolmetsch, R. S. Lewis, C. C. Goodnow , J. I. Healy, "Differential activation of transcription factors induced by Ca2+ response amplitude and duration", Nature, vol. 386, Apr. 24, 1997, pp. 855-858.

(Continued)

*Primary Examiner* — Simon Nguyen
(74) *Attorney, Agent, or Firm* — George R. McGuire; Bond Schoeneck & King, PLLC; John Pivnichny

(57) ABSTRACT

A method for molecular communication within a nanonetwork. The method includes the steps of: (i) providing a nanonetwork communication system including a transmitter, a receiver, and a physical channel layer, the physical channel layer including a medium configured to allow a communication molecule to be transmitted from the transmitter to the receiver; (ii) transmitting, via the physical channel layer, the communication molecule from the transmitter in a plurality of bursts, wherein information is encoded in the concentration of the communication molecule; (iii) receiving the (Continued)

communication molecule by the receiver; and (iv) varying at least one of the plurality of bursts, wherein varying the plurality of bursts modulates the information transmitted by the communication molecule.

17 Claims, 5 Drawing Sheets

(56) References Cited

OTHER PUBLICATIONS

O. Wolkenhauer, S.N. Sreenath, P. Wellstead, M. Ullah, K. H.Cho, "A systems- and signal oriented approach to intracellular dynamics", Biochemical Society Transactions (2005), vol. 33, part 3, pp. 507-515.

W. Trautwein, and D. Pelzer, "Kinetics and ß-Adrenergic Modulation of Cardiac Ca2+ Channels", The Calcium Channel: Structure, Function and Implications Bayer AG Centenary Symposium 1988, Springer pp. 39-53.

M. Yanagisawa, H. Kurihara, S. Kimura, K. Goto, T. Masaki, Endothelium-Derived Novel Vasoconstrictor Peptide Endothelin: A Possible Endogenous Agonist for Voltage-Dependent Ca2+ Channels, The Calcium Channel: Structure, Function and Implications Bayer AG Centenary Symposium 1988, Springer, pp. 575-585.

F. Mach, U. Schonbeck, and P. Libby, "CD40 signaling in vascular cells: A key role in atherosclerosis?," Atherosclerosis, vol. 137, pp. S89-S95, 1998, Suppl. 1.

Murray, C.J.L., and A.D. Lopez. 1997. "Global mortality, disability, and the contribution of risk factors: Global Burden of Disease Study", The Lancet vol. 349, May 17, 1997, pp. 1436-1442.

Devin L. Horton, "Regulation of Cytokines and Chemokines During the Progression of Acute Inflammation in the Human Whole Blood Model". A dissertation submitted in partial fulfillment of the requirements for the degree of Doctor of Philosophy (Cellular and Molecular Biology) in the University of Michigan. 2009.

Poole, J.C.F. and H.W. Florey. 1958. "Changes in the endothelium of the aorta and the behaviour of macrophages in experimental atheroma of rabbits". Journal of Pathology and Bacteriology vol. 75, Issue 2, pp. 245-251. (Abstract attached 3 pages).

Cybulsky, M.I., K. Iiyama, H.M. Li, S.N. Zhu, M. Chen, M. Iiyama, V. Davis, J.C. Gutierrez-Ramos, P.W. Connelly, and D.S. Milstone. May 2001. "A major role for VCAM-1, but not ICAM-1, in early atherosclerosis". The Journal of Clinical Investigation vol. 107, No. 10, pp. 1255-1262.

Cybulsky, M.I., and M.A. Gimbrone. Feb. 15, 1991. "Endothelial expression of mononuclear leukocyte adhesion molecule during atherogenesis". Science vol. 251, pp. 788-791.

Gu, L., Y. Okada, S.K. Clinton, C. Gerard, G.K. Sukhova, P. Libby, and B.J. Rollins. Aug. 1998, "Absence of monocyte chemoattractant protein-1 reduces atherosclerosis in low density lipoprotein receptor-deficient mice", Molecular Cell, Aug. 1998, vol. 2, pp. 275-281.

Boring, L., J. Gosling, M. Cleary, and I.F. Charo. 1998. "Decreased lesion formation in CCR2[-/-] mice reveals a role for chemokines in the initiation of atherosclerosis". Aug. 1998, Nature vol. 394, pp. 894-897.

Libby, P. "Inflammation in atherosclerosis" Nature, Dec. 2002, vol. 420, pp. 868-874.

Luca Felicetti, Mauro Femminella, Gianluca Reali, Paolo Gresele, Marco Malvestiti, and John N. Daigle. "Modelling CD40-Based Molecular Communications in Blood Vessels," IEEE Transactions on Nanobioscience, Sep. 2014, vol. 13, No. 3, pp. 230-243.

Beth Gelman, B N Yamaja Setty, Dechun Chen, Soheil Amin-Hanjani and Marie J Stuart, 1996. "Impaired Mobilization of Intracellular Calcium in Neonatal Platelets." Nature vol. 39, pp. 692-696. (Abstract attached 9 pages).

D. Varga-Szabo, A. Braun and B. Nieswandt. 2009 . "Calcium Signalling in Platelets". Journal of Thrombosis and Haemostasis, 7: pp. 1057-1066.

\* cited by examiner

GENERIC NETWORK INFRASTRUCTURE FOR NANO-COMMUNICATION

BACKGROUND

The present invention is directed to methods and systems for network infrastructures based on four-layer architectures.

Nanonetworks are interconnections of nanomachines, including nano-electronic devices and/or biological cells. Utilization of nanonetworks requires communication in the nanodomain, such as information transfer using terahertz frequency or by molecular communication. Molecular communication is an emerging field of communication, necessitated in large part by the demand for nanonetworks. Molecular communication allows nanomachines to communicate by exchanging molecules in an aqueous environment, and to perform collaborative tasks by integrating functionalities of individual biological nanomachines. Traditional communication methods are not suitable for nanonetworks due in part to the smaller dimensions of transmitters, receivers, and other components of the system.

There are examples of molecular communication throughout nature. For example, a biological cell utilizes molecular communication via intracellular and/or intercellular molecules to accomplish biological functions such as respiration, nerve impulse conduction, hormone secretion, and many, many more. One specific form of molecular communication is calcium ($Ca^{2+}$) signaling in which the concentration of a stream of $Ca^{2+}$ ions is modulated spatio-temporally in order to bring about processes like muscle contraction, cell differentiation, hormone secretion, and so on. However, the role of cellular signaling in normal cell functioning, as well as under pathological conditions, is still poorly understood. Accordingly, examining cellular signaling requires systematic modeling of the network (i.e., the interconnection) of cells and incorporating proper mathematical models for quantification of the associated electrochemical phenomena.

Accordingly, there is a continued need to understand molecular communication and the role of cellular signaling, as well as a need to apply that understanding to create network infrastructures based on those molecular communication pathways.

SUMMARY

The disclosure is directed to inventive methods and systems for designing generic network infrastructure for communication within or between nanonetworks. The network infrastructure comprises a four-layer architecture based on molecular communication, such as $Ca^{2+}$ signaling. These four layers are a physical channel, an information density control, an interface control, and an environmental impact control.

According to an aspect is a method for molecular communication within a nanonetwork. The method includes the steps of: (i) providing a nanonetwork communication system including a transmitter, a receiver, and a physical channel layer, the physical channel layer including a medium configured to allow a communication molecule to be transmitted from the transmitter to the receiver; (ii) transmitting, via the physical channel layer, the communication molecule from the transmitter in a plurality of bursts, wherein information is encoded in the concentration of the communication molecule; (iii) receiving the communication molecule by the receiver; and (iv) varying at least one of the plurality of bursts, wherein varying the plurality of bursts modulates the information transmitted by the communication molecule.

According to an embodiment, the communication molecule is $Ca^{2+}$.

According to an embodiment, the receiver comprises a communication molecule receptacle. According to an embodiment the communication molecule receptacle is configured to recognize only the communication molecule. According to an embodiment, the communication molecule receptacle is a $Ca^{2+}$ binding protein.

According to an embodiment, the step of varying at least one of the plurality of bursts comprises varying a time interval between three or more bursts.

According to an embodiment, the step of varying at least one of the plurality of bursts comprises varying an amount of communication molecule released during one or more bursts.

According to an embodiment, the nanonetwork communication system comprises a four-layer architecture comprising the physical channel layer, an information density control layer, an interface control layer, and an environmental impact control layer.

According to an embodiment, the transmitter comprises a store of communication molecules.

According to an aspect is a molecular communication system. The system includes: (i) a molecular transmitter comprising a store of communication molecules; (ii) a molecular receiver configured to recognize the communication molecules; (iii) a physical channel layer comprising a medium configured to allow a communication molecule to be transmitted from the transmitter to the receiver; wherein the molecular transmitter is configured to release the communication molecule from the store in a plurality of bursts, and further wherein the molecular transmitter is configured to vary at least one of the plurality of bursts, wherein varying the plurality of bursts modulates information transmitted by the communication molecule.

According to an aspect is a molecular communication system. The system includes: (i) a four-layer architecture comprising a physical channel layer, an information density control layer, an interface control layer, and an environmental impact control layer; (ii) a molecular transmitter comprising a store of communication molecules; and (iii) a molecular receiver configured to recognize the communication molecules; wherein the physical channel layer comprises a medium configured to allow a communication molecule to be transmitted from the transmitter to the receiver; wherein the molecular transmitter is configured to release the communication molecule from the store in a plurality of bursts, and further wherein the molecular transmitter is configured to vary at least one of the plurality of bursts, wherein varying the plurality of bursts modulates information transmitted by the communication molecule.

These and other aspects of the invention will be apparent from the embodiments described below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for designing generic network infrastructure for communication within or between nanonetworks. The network infrastructure comprises a four-layer architecture based on molecular communication, such as $Ca^{2+}$ signaling.

The Institute of Electrical and Electronics Engineers (IEEE) Standards Association has promulgated IEEE Standard 1906.1-2015, the *IEEE Recommended Practice for Nanoscale and Molecular Communication Framework*. According to IEEE 1906.1, the standard physical channel layer of a nanonetwork can be defined by five protocol stack components, namely: (i) message carrier; (ii) motion; (iii) field; (iv) perturbation; and (v) specificity. In TABLE 1, the five protocol stack components are defined and mapped to the functionalities of the physical channel layer in $Ca^{2+}$ signaling-based communication, as described in detail herein.

TABLE 1

Protocol stack components of physical channel layer

| Protocol Stack Component | Description | $Ca^{2+}$ Signaling |
|---|---|---|
| Specificity | Specific interaction to the intended receiver | Inositol trisphosphate (IP3) receptors, ryanodine receptors, and $Ca^{2+}$ binding proteins |
| Perturbation | Variation of carrier concentration according to the modulating signal | Amplitude modulation and $Ca^{2+}$ spike generation by mitochondria, ER, and ER pumps |
| Field | Directs the message from transmitter to receiver | Concentration gradient and potential difference at different regions works as the controlling field for $Ca^{2+}$ signaling |
| Motion | Basic propagation mechanism | $Ca^{2+}$ signals mainly propagate by diffusion |
| Message Carrier | Mass and energy | Information is encoded in terms of $Ca^{2+}$ concentration, so $Ca^{2+}$ ions function as a message carrier |

Figure 1:
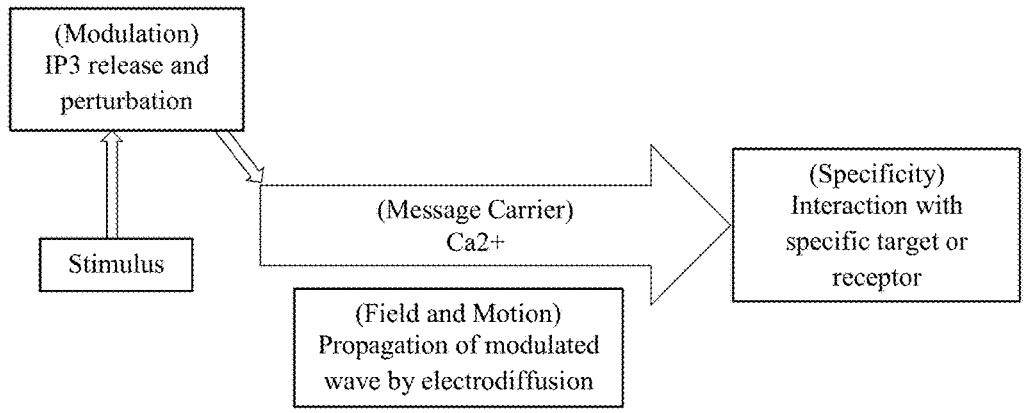
FIG. 1 is a schematic representation of $Ca^{2+}$ signaling with mapped IEEE protocol stack components, in accordance with an embodiment.

Similarly, FIG. 1 demonstrates the functionalities of the physical channel layer in $Ca^{2+}$ signaling based communication and maps the protocol stack components with them. A communication system consists of three basic phases: transmission, propagation, and reception. A modelled communication system typically models these in three phases. In $Ca^{2+}$ signaling based communication, the functionalities of the defined protocol stack components, as shown in TABLE 1, of the physical channel can be integrated to achieve these three phases. For example, the functionality of the perturbation comes under transmission, the field and motion comes under propagation and the specificity is required for modelling the reception.

Four-Layer Architecture

Figure 2:
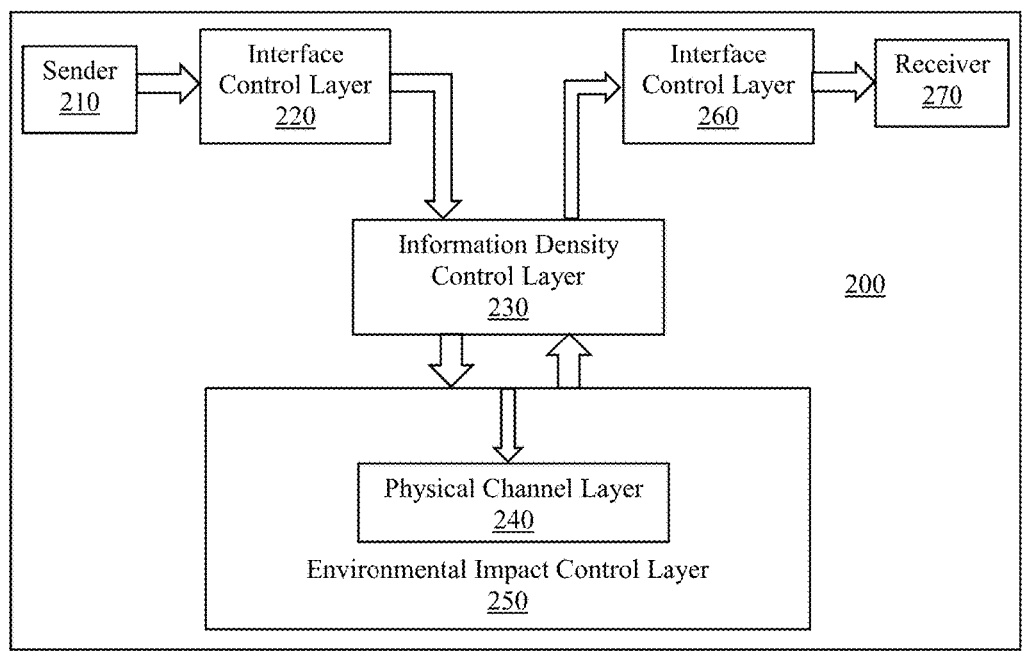
FIG. 2 is a schematic representation of four-layer architecture utilized to send a message from a sender to a receiver, in accordance with an embodiment.

Referring to FIG. 2, in one embodiment, is a diagram of four-layer architecture 200 utilized to send a message from a sender 210 to a receiver 270. According to an embodiment, the four-layer architecture 200 comprises a physical channel layer 240, an information density control layer 230, an interface control layer 220 and 260, and an environmental impact control layer 250.

According to an embodiment, the Physical Channel Layer 240 is the physical channel for $Ca^{2+}$ signaling is an aqueous medium (cytosol) through which $Ca^{2+}$ ions diffuse from one region to another within a cell or among cells from transmitter to the receiver. The physical channel is characterized by the distribution of components in it. Cell organelles like mitochondria, endoplasmic reticulum (ER) and various $Ca^{2+}$ pumps form feedback loops that regulate the amplitude and frequency of $Ca^{2+}$ signal locally.

According to an embodiment, the Information Density Control Layer 230 deals with the broadcast range control by determining the effect of multiplexing $Ca^{2+}$ signals from different channels on the spatio-temporal propagation of the $Ca^{2+}$ signals. Upon application of stimulus, the $Ca^{2+}$ release into cytosol of the adjacent cells may be initiated through three different types of channels mainly: voltage-operated channels (VOCs), receptor-operated channels (ROCs), and store-operated channels (SOCs). These channels have different mechanism of activation and help reach to the cell containing receiver.

According to an embodiment, the Interface Control Layer 220 and 260 quantifies different types of stimuli and their relationship with the $Ca^{2+}$ release pattern over time into the cytosol.

According to an embodiment, the Environmental Impact Control Layer 250 requires investigation and analysis of the impact of different environmental parameters such as temperature, pH, etc., on the signaling rate or on the efficiency of information transfer that has an important role of this layer. The understanding of these interactions is imperative for the determination of the secondary effects that arise due to cross-talk between calcium and other channels i.e., VOC or ROC or SOC. According to an embodiment, the Environmental Impact Control Layer is the topmost layer of the architecture, although it can enclose the Physical Channel Layer as it deals with all the secondary phenomena of the physical channel which affect $Ca^{2+}$ signaling but do not play a direct role in the communication process.

Protocol Stack Components of Physical Channel Layer

As set forth above, the physical channel layer of a nanonetwork can be defined by five protocol stack components: (i) Message carrier; (ii) Motion; (iii) Field; (iv) Perturbation; and (v) Specificity. In TABLE 1, above, the five protocol stack components are defined and mapped to the functionalities of the physical channel layer in $Ca^{2+}$ signaling-based communication, as described in detail herein.

(i) Message carrier: This component provides the service of transmitting a message from sender to a receiver. In $Ca^{2+}$ signaling the information is encoded in terms of $Ca^{2+}$ concentration and this produced $Ca^{2+}$ wave is transmitted throughout the medium (here cytosol) from the transmitter to the receiver. So the $Ca^{2+}$ is the message carrier.

(ii) Motion and (iii) Field: Motion component provides the ability of the message carrier to propagate efficiently. In calcium signaling, the propagation of calcium waves is governed initially by diffusion caused by the concentration gradient. The field component directs the message from transmitter towards the receiver so that the message can reach to the receiver properly. The propagation mechanism can be termed electro-diffusion.

(iv) Perturbation: Perturbation provides the ability to vary the message carrier signal according to the modulating signal. It is achieved by controlling the $Ca^{2+}$ spikes generation by the cumulative effect of different cell components such as the mitochondria, ER, molecular pumps, and so on.

(v) Specificity: This protocol stack component ensures message carriers to connect with their intended receivers. In $Ca^{2+}$ signaling, $Ca^{2+}$ binding proteins such as paralbumin, calbindin, and calretinin, among others, serve the purpose of specific receivers.

FIG. 2 shows the functionalities of the physical channel layer in Calcium signaling based communication and maps the protocol stack components with them.

Physical Channel Modeling

Unlike conventional communication system in $Ca^{2+}$ signaling based communication different cell components (organelles) mainly mitochondria and ER play active role $Ca^{2+}$ signal modulation. This modulated $Ca^{2+}$ waves finally reach to the intended receivers and are demodulated by ligand/receptor binding mechanisms in the receivers. Thus, modeling of physical channel involves three subtasks: (1) modeling the cell components to modulate the $Ca^{2+}$ waves; (2) modelling the intra- and inter-cellular propagation of these $Ca^{2+}$ waves; and (3) modeling the receiver.

1. Mathematical Modeling of the Components

To model the cell components mathematically, there are five variables. These are: cytosolic $Ca^{2+}$ concentration ($Ca_{Cyt}$); $Ca^{2+}$ concentration present in ER ($Ca_{ER}$); mitochondrial $Ca^{2+}$ concentration ($Ca_m$); free $Ca^{2+}$ binding sites (Pr) on cytosolic proteins and the concentration of bounded $Ca^{2+}$ binding sites ($Ca_{Pr}$) on cytosolic proteins. Mainly $IP_3$ works the binding of $Ca^{2+}$ ions with these cytosolic proteins.

At first by applying the conservation relation, there is:

$$Ca_{tot} = Ca_{Cyt} + \frac{\rho_{ER}}{\beta_{ER}} Ca_{ER} + \frac{\rho_m}{\beta_m} Ca_m + CaPr \qquad \text{Eq. (1)}$$

where $Ca_{tot}$ is the total cellular $Ca^{2+}$ concentration. Similarly for total concentration of bound and unbound proteins there is:

$$Pr_{tot} = Pr + CaPr \qquad \text{Eq. (2)}$$

Here, $\tilde{n}_{ER}$ and $\tilde{n}_m$ represent the volume ratio between ER and cytosol and between mitochondria and cytosol respectively. Also, $\hat{a}_{ER}$ and $\hat{a}_m$ are constant factors for relating the concentrations of free calcium in the ER and the mitochondria to the respective total concentrations. The $PR_{tot}$ always remains constant but when an external stimulus (modulating signal) is applied some $Ca^{2+}$ bounded site on cytosolic proteins become dissociated producing free $Ca^{2+}$ binding site and free $Ca^{2+}$ ions which are released in the aqueous cytosol. Thus the cytosolic proteins work as transmitter in this $Ca^{2+}$ based communication. Now there is the need to mathematically model the exchanges between the cytosol and ER and the exchanges between the cytosol and mitochondria. Between ER and mitochondria three $Ca^{2+}$ exchanges takes place: (1) the ATP-dependent calcium uptake from the cytosol into the ER (Jpump); (2) the $Ca^{2+}$ emission flux from the ER through channels following the calcium-induced calcium release (CICR) mechanism ($J_{ch}$); and (3) an additional $Ca^{2+}$ leak flux from the ER into the cytosol (Jleak). Between mitochondria and ER two exchanges take place: active $Ca^{2+}$ uptake by mitochondrial uniporters (Jin), calcium release as the combined effect of $Na^+/Ca^{2+}$ exchangers and mitochondrial permeability transition pores (PTPs) in a very low conductance state, and a very small non-specific leak flux (Jout). Concentration change of $Ca_{Cyt}$ with regard to time is dependent on fluxes across ER membrane, by $Ca^{2+}$ exchange with the mitochondria and $Ca^{2+}$ binding the calcium binding cytosolic proteins. The basic equation of this phenomenon is $$\frac{dCa_{Cyt}}{dt} = J_{ch} + J_{leak} - J_{pump} + J_{out} - J_{in} + k_+ CaPr + k_- Ca_{Cyt} Pr \qquad \text{Eq. (3)}$$

where $k_+$ and $k_-$ represents the on-rate and off-rate constants of $Ca^{2+}$ binding. The rate of change of Ca concentration in ER is given by the following equation:

$$\frac{dCa_{ER}}{dt} = \frac{\rho_{ER}}{\beta_{ER}} (J_{pump} - J_{ch} - J_{leak}) \qquad \text{Eq. (4)}$$

The equation of $Ca^{2+}$ concentration in mitochondria is given as:

$$\frac{dCa_m}{dt} = \frac{\rho_m}{\beta_m} (J_{in} - J_{out}) \qquad \text{Eq. (5)}$$

The ATPase-mediated $Ca^{2+}$ flux $J_{pump}$ is given as $J_{pump} = k_{pump} Ca_{Cyt}$ where $k_{pump}$ is the rate constant of ATPases. The channel flux $J_{ch}$ and leak flux $J_{leak}$ are given as:

$$J_{ch} = k_{ch} \frac{Ca_{Cyt}^2}{K_1^2 + Ca_{Cyt}^2} (Ca_{ER} - Ca_{Cyt}) \qquad \text{Eq. (6)}$$

$$J_{leak} = k_{leak} (Ca_{ER} - Ca_{Cyt}) \qquad \text{Eq. (7)}$$

where $k_{ch}$ represents the maximal permeability of the $Ca^{2+}$ channels in the ER membrane, $K_1$ represents the half-saturation for $Ca^{2+}$ and $k_{leak}$ is the rate constant for $Ca^{2+}$ leak flux through the ER membrane. The mitochondrial calcium uptake by uniporters is given as:

$$J_{in} = k_{in} \frac{Ca_{Cyt}^8}{K_2^8 + Ca_{Cyt}^8} \qquad \text{Eq. (8)}$$

where $k_{in}$ represents the maximum permeability of uniporters in the mitochondrial membrane.

The mitochondrial $Ca^{2+}$ efflux $J_{out}$ is given as:

$$J_{out} = \left(k_{out}\frac{Ca_{Cyt}^2}{K_3^2 + Ca_{Cyt}^2} + k\right)Ca_m \quad \text{Eq. (9)}$$

Figure 3:
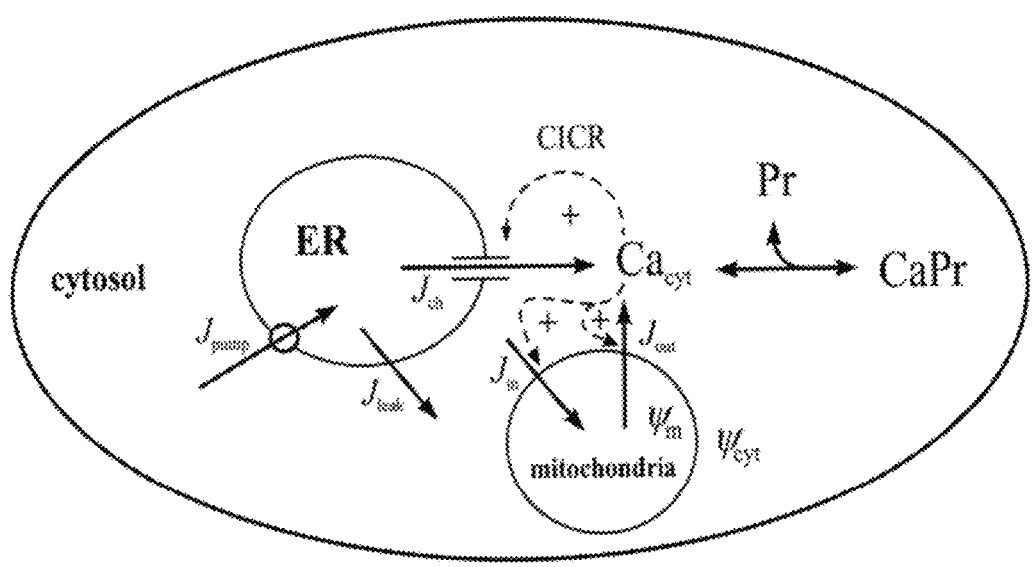
FIG. 3 is a schematic representation of cell components and calcium signaling.

By the application of stimulus some bounded $Ca^{2+}$ binding sites (CaPr) on the cytosolic $Ca^{2+}$ binding proteins are dissociated producing free $Ca^{2+}$ binding receptors (Pr) and free $Ca^{2+}$ ions. So the concentration of $Ca^{2+}$ in the cytosol near the $Ca^{2+}$ binding proteins (transmitters) increases. This change of concentration in $Ca^{2+}$ in the aqueous cytosol causes change of Ca exchanges between mitochondria and cytosol and Ca exchanges between ER and cytosol according to the mathematical equations discussed above. This cumulative effect gives rise a regenerative time variation of the concentration of $Ca^{2+}$ in the cytosol near the transmitters. As rate of dissociation of CaPr is dependent on the nature of the stimulus so the ultimate time variation of cytosolic concentration of $Ca^{2+}$ is dependent on the nature of the stimulus justifying the perturbation and this time variation of cytosolic concentration of $Ca^{2+}$ is the modulated $Ca^{2+}$ wave. The whole mechanism is displayed in FIG. 3.

Solution Scheme

The methodology and calculations set forth above can be utilized to determine the concentration of $Ca^{2+}$ in the cytosol, the mitochondria, and the ER, using the input parameters set forth in TABLE 2. The different cell components, such as the mitochondria, ER, and others, are created in the cell cytosol with specific parameters (such as dimension, location, absorption rate etc.), and the above set of equations are numerically solved by the Runge-Kutta method, thereby revealing the concentration of $Ca^{2+}$ in the cytosol, the mitochondria, and the ER. Although model parameters utilized in the calculation are listed in TABLE 2, many other model parameters are possible.

TABLE 2

Input Parameters for Determining $Ca^{2+}$ concentration

| Parameter | Value | Parameter | Value | Parameter | Value | Parameter | Value |
|---|---|---|---|---|---|---|---|
| $Ca_{tot}$ | 90 μM | $\hat{a}_{ER}$ | 0.0025 | kout | 125 s$^{-1}$ | $K_2$ | 0.8 μM |
| $Pr_{tot}$ | 120 μM | $k_{ch}$ | 4100 s$^{-1}$ | $k_m$ | 0.00625 s$^{-1}$ | $K_3$ | 5 μM |
| $\tilde{n}_{ER}$ | 0.01 | $k_{pump}$ | 20 s$^{-1}$ | $k_+$ | 0.1 μM$^{-1}$s$^{-1}$ | | |
| $\tilde{n}_m$ | 0.01 | $k_{leak}$ | 0.05 s$^{-1}$ | $k_-$ | 0.01 s$^{-1}$ | | |
| $\hat{a}_m$ | 0.0025 | $k_{in}$ | 300 μMs$^{-1}$ | $K_l$ | 5 μM | | |

2. Mathematical Model for Electro-Diffusion

The modulated $Ca^{2+}$ waves propagate through the cellular space by electro-diffusion. Below, the propagation of $Ca^{2+}$ in the intracellular as well as intercellular space by electro-diffusion is mathematically modeled using an electro-neutral model. A spherical cell is modeled as a three-dimensional space with a uniform spherical membrane of uniform thickness. According to the external stimulus, the calcium wave is generated within a cell, propagates through the intracellular cytosolic medium towards the membrane. Upon reaching the membrane, these ions either add to the surface charge on the membrane or enter the extracellular space in the form of transmembrane current through the membrane ion channels. The membrane acts as a capacitor and maintains a membrane potential across it as described in.

In the electro neutral model, the ionic concentration follows ion conservation, drift-diffusion flux equation and electro neutrality condition given below:

$$\frac{\partial c}{\partial t} = -\nabla \cdot f \quad \text{Eq. (10)}$$

$$f = -D\left(\nabla c + \frac{qzc}{k_B T}\nabla \Phi\right) \quad \text{Eq. (11)}$$

$$0 = \rho_0 + qzc \quad \text{Eq. (12)}$$

Here, f denotes the flux, D is the diffusion coefficient, qz is the amount of charge of $Ca^{2+}$, where q is the elementary charge, i.e., the charge on a proton. qD ($=k_B T$) is the mobility of $Ca^{2+}$ (Einstein relation) where $k_B$ is the Boltzmann constant, and T is the absolute temperature. $\rho_0$ is the background charge density. The boundary condition for the membrane is given as below:

$$q\vec{z}f = C_m \frac{\partial(\varphi_m)}{\partial t} + j \quad \text{Eq. (13)}$$

where $\varphi_m$ is the membrane potential and j is the transmembrane current.

3. Solution Scheme

To solve the coupled partial differential equations (PDEs), the numerical scheme is adopted, where a finite-volume method (FVM) is used to solve the PDEs. FVM is a method for representing and evaluating PDEs in the form of algebraic equations. A spherical boundary is incorporated to the computational domain that represents the cell membrane. $Ca^{2+}$ concentration is calculated in the intracellular region and its adjacent cell. A three dimensional spherical mesh has been laid within this domain such that concentric finite volumes (FVs) are formed. Each FV (p) has a characteristic point ($x_c$) where the properties of that FV are defined. The divergence theorem is used to convert the volume integrals in a PDE that contains a divergence term to surface integrals. The flux through each face common to a pair of FVs, (p,p') is then calculated.

The flux entering a FV (p') is identical to that leaving the adjacent FV (p). At $x=x_c$:

$$\frac{\partial c}{\partial t} \approx \frac{1}{V} > \int_{finite\ volume} \frac{\partial c}{\partial t} dV = \quad \text{Eq. (14)}$$

$$-\frac{1}{V}\int_{finite\ volume} f \cdot n dA \approx -\frac{1}{V}\sum_1 e_1 F^1$$

where $F^{(p,p')}$ is the flux density approximation from FV p to p'. The ionic concentration is conserved when:

$$F^{(p,p')} = -F^{(p',p)} \quad \text{Eq. (15)}$$

$$\frac{\partial c^P}{\partial t} = -\frac{1}{V} \sum_{p \neq p'} \left[ hF^{(p,p')} + \gamma^{p,p'} G^{(p,p')} \right] \quad \text{Eq. (16)}$$

where h is the area of the face common to finite volumes p and p' and $G^{(p,p')}$ is the flux from a finite volume p to another finite volume p' that share a membrane of area $\gamma^{p,p'}$, so $G^{(p,p')}$ is termed as the membrane flux will make an effect only for the boundary FVs of the cell. For ordinary FVs in the intracellular space, $\gamma^{p,p'}=0$, so the second term is zero. The ordinary flux $F^{p,p'}$ is calculated using the equation $$F = D\left[ \frac{c^P - c^{P'}}{h} + \frac{qz(c^P + c^{P'})}{2K_B T} \frac{\varphi^P + \varphi^{P'}}{h} \right] \quad \text{Eq. (17)}$$

where D is the diffusion coefficient. The expression gives the potential difference between the representative points $x_c$ for the finite volumes p and .=2 for $Ca^{2+}$ as it is divalent. To calculate the concentration in the $(n+1)^{th}$ instant from that in the $n^{th}$ instant of time we use the relation:

$$\frac{c^{p,n+1} - c^{p,n}}{\Delta t} = -\frac{1}{V} \sum_{p \neq p'} \left[ hF^{(p,p',n)} \right] \quad \text{Eq. (18)}$$

where should have a value long enough for the ions to move over from one FV to an adjacent FV in this time period. However, it should not be so long that ions can move over more than one FV.

The membrane flux is calculated numerically by the equation given as below:

$$qzG_i^{(p,p')} = C_m \frac{\varphi_m^{(p,p',n)} - \varphi_m^{(p,p',n-1)}}{\Delta t} + j_i^{(p,p')} \quad \text{Eq. (19)}$$

4. Modeling the Receiver

The modulated $Ca^{2+}$ signals reach to the receiver and are demodulated by ligand-receptor binding mechanism where $Ca^{2+}$ ions work as ligand. A cell kinetic model of this binding mechanism is adopted, and it is considered that the receptors reside on the cell-surface (i.e., the external side of the cell-membrane) of the receiver-cell. After reaching the receiver, the $Ca^{2+}$ ions are bound to free receptors forming ligand/receptor complexes. Depending on the formation of these ligand/receptor complexes, the modulated $Ca^{2+}$ signal is decoded at the receiver cell. To model mathematically these ligand/receptors bindings, we consider a set of variables: the number of free receptors on the cell-surface ($R_s$), the number of receptor/ligand complexes on the cell-surface ($C_s$), the total number of free plus bound receptors in endosomes ($R_{Ti}$), the total number of intracellular $Ca^{2+}$ ions ($L_i^\#$) i.e., which are generated from the receiver cell internally, the $Ca^{2+}$ concentration in the medium (L) and the rate of new receptor synthesis ($V_s$). The binding of $Ca^{2+}$ ions with the receptors can be represented by a set of differential equations:

$$\frac{dR_s}{dt} = -k_f LR_s + k_r C_s - k_{eR} R_s + k_{rec}(1-f_R)R_{Ti} + V_s \quad \text{Eq. (20)}$$

$$\frac{dC_s}{dt} = k_f LR_s - k_r C_s - k_{eC} C_s \quad \text{Eq. (21)}$$

$$\frac{dR_{Ti}}{dt} = k_{eR} R_s + k_{eC} C_s + [k_{reC}(1-f_R) + k_{deg} f_R]R_{Ti} \quad \text{Eq. (22)}$$

$$\frac{dL_i^\#}{dt} = k_{eC} C_s + [k_{rec}(1-f_L) + k_{deg} f_L]L_i^\# + k_{fp} N_{Av} L \quad \text{Eq. (23)}$$

where $k_f$ and $k_r$ are reaction rate constants of receptor/ligand binding and dissociation respectively. It is assumed that each receptor has one binding site (i.e., one receptor can bind one $Ca^{2+}$ ion) and the binding is simple bimolecular non-cooperative binding. Rate constants describing the internalization of receptor/ligand complexes and free-receptors are $k_{eC}$ and $k_{eR}$ respectively. $k_{reC}$ represents the intrinsic rate constant for transport of material via vesicles from the endosome back to the cell-surface. $(1-f_R)$ and $(1-f_L)$ are the fraction of endocytosed receptors and ligands. $k_{deg}$ represents a lumped rate constant for the routing of material from the endosome to the lysosome, degradation in the lysosome, and the release of fragments in the extracellular medium.

4. Solving Method

Equations (20) through (23) can be solved, for example, using the Runge-Kutta method, such as in MATLAB, that will show how the rate of change of bounded ligand/receptor complexes occur. This rate of change of the number of bounded ligand/receptor complexes represent demodulated signal.

Results and Discussion

First, the cell-components (mitochondria, ER) are modeled to modulate the $Ca^{2+}$ waves. To test the solution scheme, it is assumed that there is a single transmitter for the sake of simplicity, and mitochondria and ER are uniformly distributed throughout the cell and their individual dimension negligible compared to the dimensions of entire cell.

Figure 4:
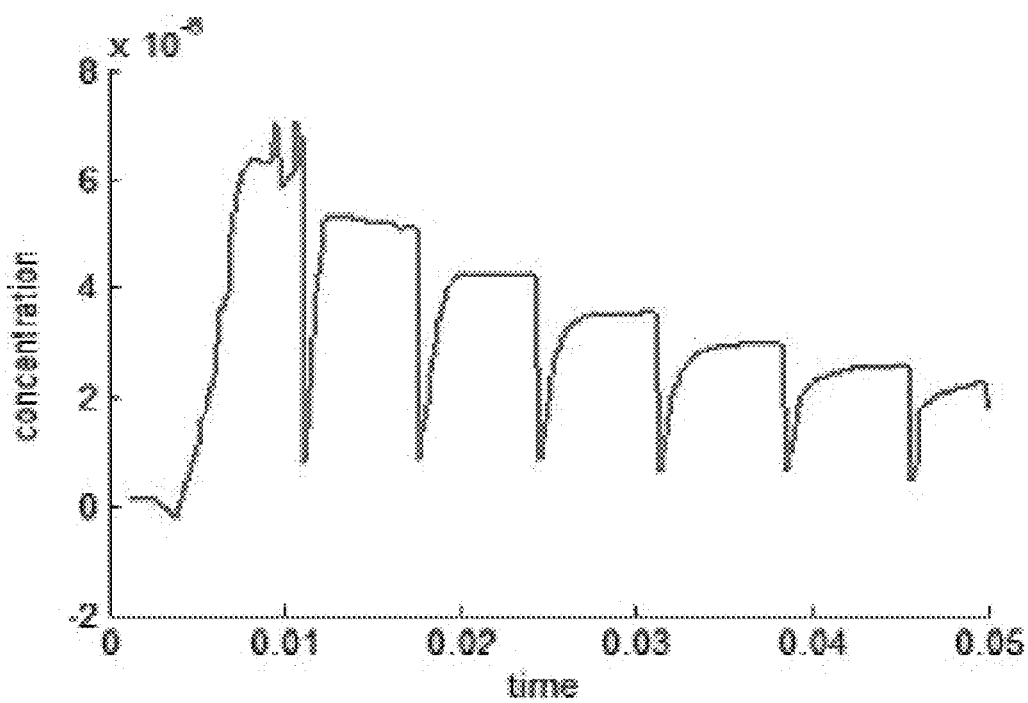
FIG. 4 is a graph of $Ca^{2+}$ concentration over time resulting from $Ca^{2+}$ emission from a transmitter, following a stimulus which is a series of pulses.
Figure 5:
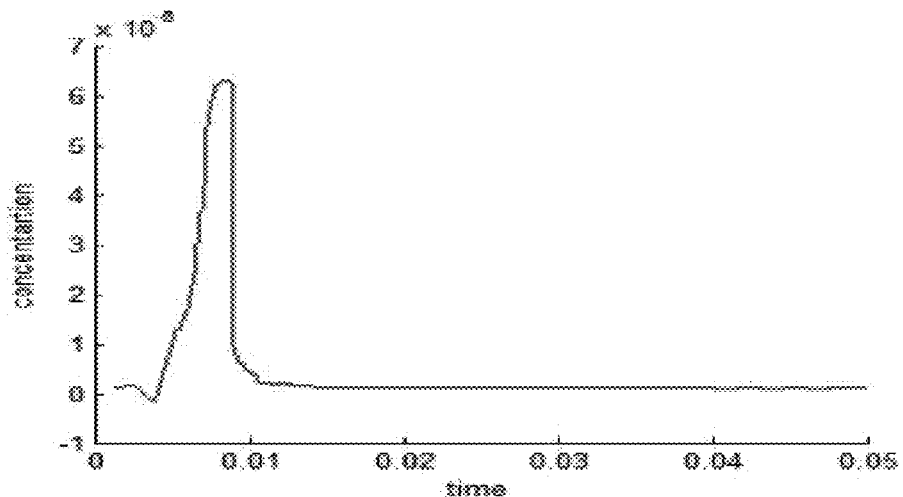
FIG. 5 is a graph of $Ca^{2+}$ concentration over time resulting from $Ca^{2+}$ emission from a transmitter, following a stimulus which is one pulse.

When stimulus is applied, $Ca^{2+}$ ions are emitted in the aqueous cytosol from the transmitter. Accordingly, there is time variation of the concentration of $Ca^{2+}$ in the cytosol near the transmitter. FIGS. 4 AND 5 show the variation of concentration of $Ca^{2+}$ near the transmitter for $Ca^{2+}$ emission from the transmitter for two type of stimuli namely train of pulses (FIG. 4) and single pulses (FIG. 5), respectively. For two types of stimuli, two types of concentration of $Ca^{2+}$ patterns are observed. Thus, the perturbation protocol stack component is justified.

In the simulation, a space consisting of two adjacent cells is considered, and the whole space consisting of these two cells are divided into seven finite volumes. The transmitter is situated at the $1^{st}$ finite volume (FV1), and the intercellular membrane is situated at the boundary of $3^{rd}$ (FV3) and $4^{th}$ (FV4) finite volumes. The receptors are located on the membrane. First cell contains the transmitter and the second cell works as the receiver. The transmitter transmits the modulated calcium waves and this modulated wave propagates through the aqueous cytosol by electro-diffusion mechanism.

Graphing the time variation of calcium concentration in the seven finite volumes for train of pulses and single pulse type emission pattern reveals that due to $Ca^{2+}$ emission from the transmitter, time variation of the concentration of $Ca^{2+}$ (i.e., $Ca^{2+}$ waves), occurs in all the finite volume which justifies the field and motion protocol components are justified and $Ca^{2+}$ waves acts as a message carrier. The another observation is that the time variation of $Ca^{2+}$ waves decreases from the first finite volume to the last (seventh)

finite volume i.e. time variations of $Ca^{2+}$ waves decrease with increasing the distance from the transmitter which may be analogous to attenuation due to distance in conventional communication systems.

Graphing the concentration in different finite volumes at some discrete instants of time for the same two emission patterns reveals that there is an abrupt concentration change at the $4^{th}$ Finite volume (FV4). This phenomenon can be justified by the capacitive action of the membrane. Due to this capacitive action, a jump in electrostatic potential (membrane potential) is maintained across the cell membrane. Therefore, there is a thin space charge layer on both sides of the membrane which is the cause of this abrupt change in concentration.

The propagated $Ca^{2+}$ waves ultimately reaches to the intended receiver and the modulating signal is decoded in the receiver from these received modulated $Ca^{2+}$ waves. Some certain receivers (specific to the ligand) are situated in the system for this purpose. Accordingly, specificity is also maintained.

As mentioned above, the intercellular membrane is situated at the boundary of $3^{rd}$ (FV3) and 4th (FV4) finite volumes. Accordingly, the receiver has been placed on the cell membrane.

Graphing the $Ca^{2+}$ concentration variation in $3^{rd}$ Finite Volume (FV3) over time, and graphing the time variation of the rate of formation of ligand ($Ca^{2+}$)/receptor complexes reveals negligible differences between the two, which signifies the successful demodulation of the coming signal.

Example—Arteriosclerosis

Atherosclerosis, commonly known as a disease of the arteries characterized by the deposition of fatty material on their inner walls, can be utilized as an example with the model described herein. The generic infrastructure model described above can be implemented with the different factors of atherosclerosis.

Atherosclerosis is a chronic inflammatory disorder of the arteries and the leading cause of death and illness. Both advanced glycation end-products (AGEs) and oxidized low-density lipoproteins (LDLs) are hallmarks of atherosclerosis. In response to a high cholesterol diet, for example, circulating leukocytes bind to endothelial cells lining the inner most layer or the intima of the arteries. LDL oxidation induces leukocyte adhesion molecule expression on the luminal layer of the intima, resulting in monocyte adherence to the endothelial cells. The up-regulation of monocyte chemoattractant protein-1 (MCP-1) by the activated endothelial cells induces the migration of monocytes through the cell layer into the arterial intima where they morphologically transform into macrophages. These macrophages express receptors for AGE and other lipoproteins, and as a consequence of the ligand receptor interactions, they induce reactive oxygen species formation and secrete pro-inflammatory mediators, enabling the inflammatory response. They also secrete matrix metalloproteinases, which degrade the extracellular matrix and promote aggregation of macrophages causing plaque formation. Plaque is made up of fat, cholesterol, calcium, and other substances found in the blood. When a plaque ruptures, coagulation and wound healing is activated, leading to a narrowing of the artery and ultimately an infarct, or tissue necrosis due to the sudden lack of blood supply.

Recent reports helped to explain that contact dependent interaction between CD40 and CD40 ligand (CD40L, renamed CD154) would act as a stimulus for atheroma-associated cells. It is also suggested that CD40L activates atheroma-associated cells by promoting the expression of molecules thought to be involved in atherosclerosis, such as adhesion molecules, cytokines, matrix metalloproteinases, and tissue factor. Thus, CD40 ligation on these vascular wall cells might promote mononuclear cell recruitment, participate in the weakening of the plaque and set the stage for thrombosis, mechanisms of crucial importance in the process of atherosclerosis.

Mapping of Physical Layer Functions with Different Factors of Atherosclerosis

The physical layer functions in generic infrastructure model can be used to map to different factors of atherosclerosis. The underlying communication events among different factors of atherosclerosis can be as set forth below:

(a) The primary components of the underlying communication system are endothelial cells, which line the inner blood vessels and serve as receivers, and platelets, which are present in the blood stream and serve as transmitters.

(b) The transmitters, which are mobile platelets, secrete (among other things) cytokines, which are small cell-signalling protein molecules. These cytokines are transmitted to the cells across the bloodstream. There are many types of cytokines, and each type has a matching type of receptor on the cell surface.

(c) In this case, the cytokine of interest is the soluble CD40 ligand, or sCD40L, and the matching receptor on the cell surface is called CD40. Each cell has a number of CD40 receptors, and this number changes over time.

(d) CD40L activates atheroma-associated cells by promoting the expression of molecules thought to be involved in atherosclerosis, such as adhesion molecules, cytokines, matrix metalloproteinases, and tissue factor.

$Ca^{2+}$ plays an important role to release soluble CD40 ligand, or sCD40L:

(a) Platelets play a key role in the prevention of hemorrhage after vascular damage. $Ca^{2+}$ is known to be an important modulator of many platelet functions. It is stored intracellularly in the dense tubular system and is released into the cytoplasm after platelet activation by several mechanisms.

(b) Agonist-induced stimulation of different platelet receptors leads to the activation of phospholipase (PL) C isoforms, which hydrolyzephosphoinositide-4,5-bisphosphate ($PIP_2$) to inositol-1, 4,5-trisphosphate ($IP_3$).

(c) $IP_3$ releases $Ca^{2+}$ from the intracellular stores and in turn $Ca^{2+}$ sensors in ER membrane (called STIM1) opens Orai1 channels in the plasma membrane, a process called store-operated calcium entry (SOCE).

(d) This agonist-induced elevation in cytosolic $Ca^{2+}$ concentration is essential for platelet activation and this platelet aggregation and activation is associated with the release of soluble CD40L.

Figure 6:
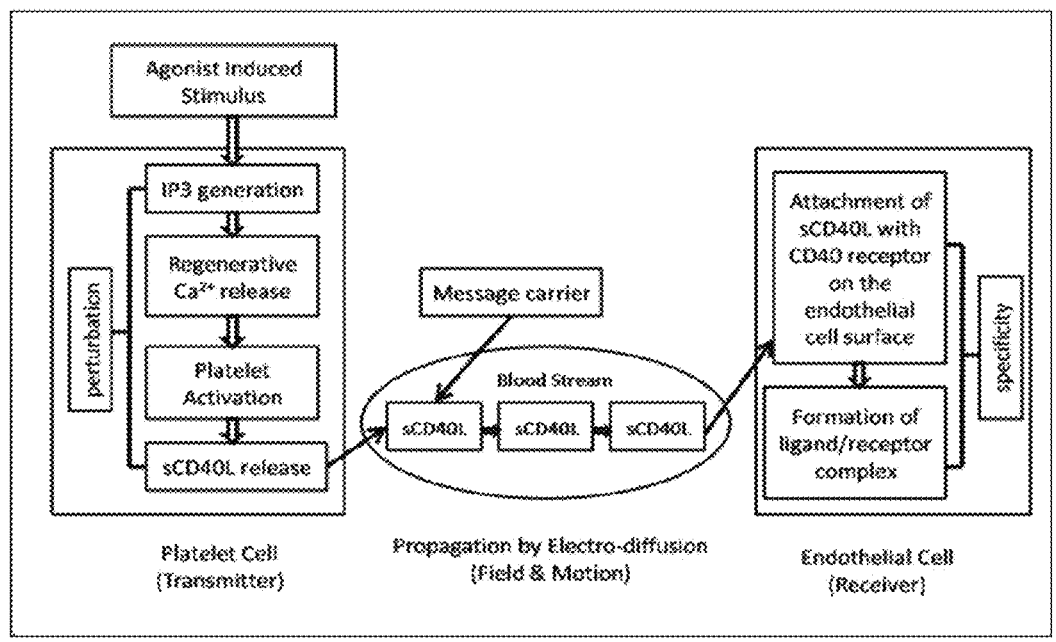
FIG. 6 is a schematic representation of molecular communication in arteriosclerosis.

Physical channel functions in generic infrastructure model map with underlying communication events among different factors of atherosclerosis, as shown in FIG. 6.

According to the transmitter model:
1. Agonist induced stimulus generates $IP_3$ in platelets;
2. $IP_3$ initiates the release of $Ca^{2+}$ from a number of intracellular stores. The cumulative action of different platelet organelles e.g. mitochondria, ER, etc., regenerates $Ca^{2+}$. The regenerative action will continue till agonist induced stimulus generates $IP_3$;
3. $Ca^{2+}$ release in platelet cytosol makes the platelet activation;
4. This activation is associated with the release of sCD40L which acts as a message carrier.

The overall process stated in steps 1 to 4 can be mapped to perturbation and can be modeled by using the set of differential equations described in transmitter model proposed in the generic infrastructure model, as described or otherwise envisioned herein.

According to the propagation model, the sCD40L moves across the blood stream in presence of concentration gradient and electric field depicting the two physical layer functions motion and field respectively. This can be modeled by the electro-diffusion equations described in propagation model proposed in the generic infrastructure model, as described or otherwise envisioned herein.

And finally, according to the receiver model, the sCD40 ligands bind with the matching receptors CD40 on the endothelial cell surface and form ligand/receptor complexes which can be mapped to specificity. This can be modeled by the set of differential equations described in receiver model proposed in the generic infrastructure model, as described or otherwise envisioned herein.

Figure 7:
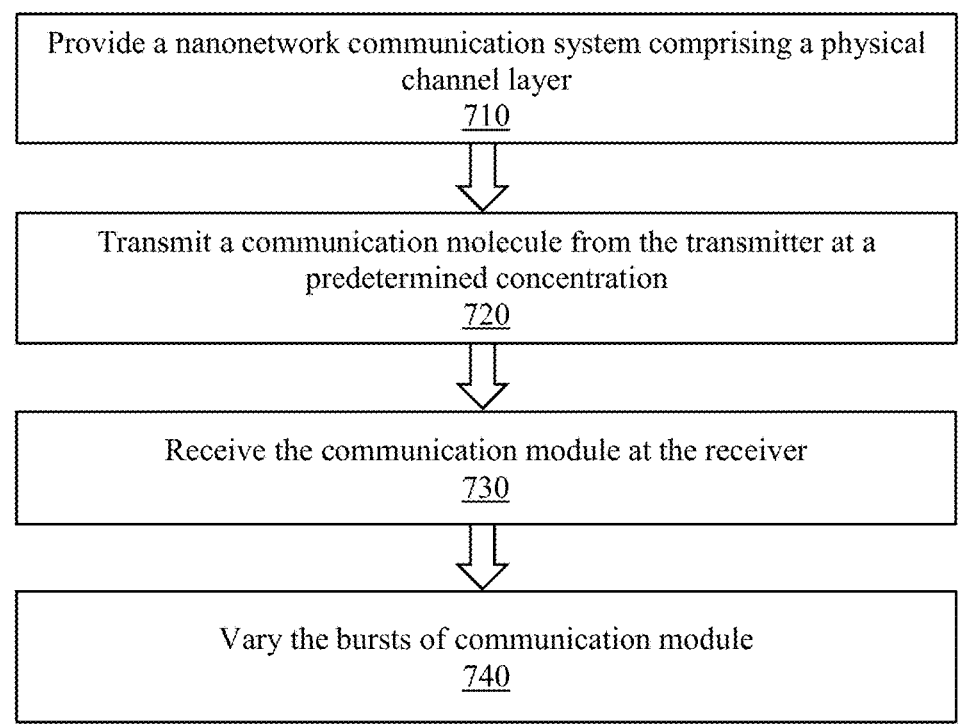
FIG. 7 is a flowchart of a method for molecular communication, in accordance with an embodiment.

Referring to FIG. 7, in one embodiment, is a flowchart of a method 700 for molecular communication. The method may be or comprise any of the steps described or otherwise envisioned herein.

At step 710 of the method, a nanonetwork communication system is presented. The nanonetwork communication system is utilized to send a message from a sender to a receiver, which may be people, cells, computers, or any other sender or receiver. The nanonetwork communication system can comprise, for example, a physical channel layer, which in turn comprises a medium through which a communication molecule is transmitted from a transmitter to a receiver. The nanonetwork communication system may also comprise an information density control layer, an interface control layer, and an environmental impact control layer.

At step 720 of the method, a communication molecule is transmitted from the transmitter. According to an embodiment, the communication molecule is $Ca^{2+}$. For example, the transmission may comprise a plurality of ions, such as $Ca^{2+}$ ions, released from a store of $Ca^{2+}$ ions. The transmitted communication molecule travels outward from the transmitter via the physical channel layer of the nanonetwork communication system. The information communicated by the system is encoded in terms of the concentration of the communication molecule. For example, in $Ca^{2+}$ signaling the information is encoded in terms of $Ca^{2+}$ concentration and this produced $Ca^{2+}$ wave is transmitted throughout the medium from the transmitter to the receiver.

According to an embodiment, the communication molecule is transmitted from the transmitter in one or a plurality of bursts. As described herein, information may be encoded in the bursts as well as in the concentration of the communication molecule.

At step 730 of the method, the receiver receives the transmitted communication molecule. According to an embodiment, the receiver and/or the communication molecule is configured to specifically recognize the communication molecule. In $Ca^{2+}$ signaling, for example, $Ca^{2+}$ binding proteins such as paralbumin, calbindin, and calretinin, among others, serve the purpose of specific receivers.

At step 740 of the method, the plurality of bursts of communication molecule released by the transmitter can be varied in order to modulate, change, or vary the information transmitted by the communication molecule. For example, the plurality of bursts of the communication molecule can be varied several different ways. One way to vary the bursts is to change the amount of time between bursts, by increasing the amount of time or decreasing the amount of time. Another way to vary the bursts is to change the amount of communication molecule released by the transmitter during the bursts, by increasing the amount or decreasing the amount. Other ways of varying the plurality of bursts of communication molecule released by the transmitter are possible.

Figure 8:
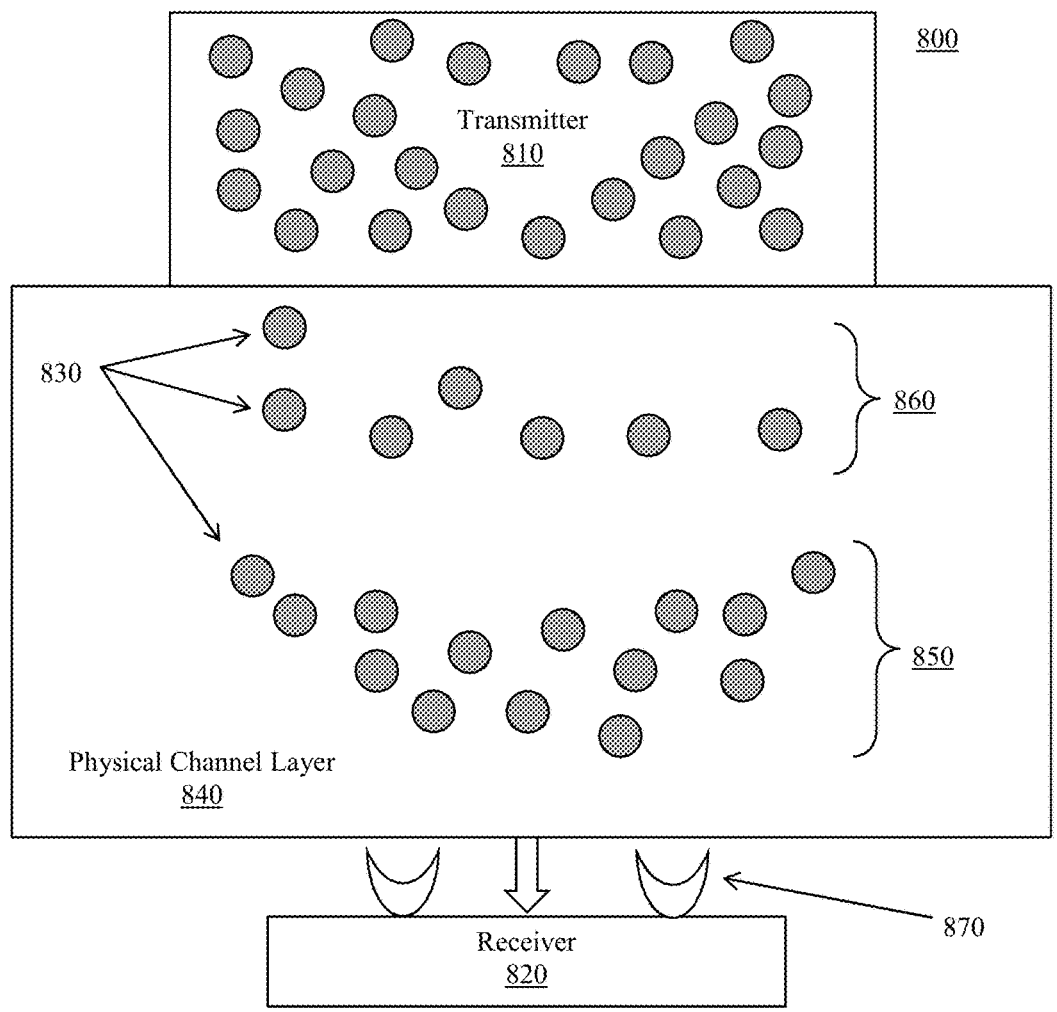
FIG. 8 is a schematic representation of a system for molecular communication, in accordance with an embodiment.

Referring to FIG. 8, in one embodiment, is a nanonetwork communication system 800. The system may or may not comprise any of the components, elements, or steps described or otherwise envisioned herein. The nanonetwork communication system is utilized to send a message from a sender to a receiver, which may be people, cells, computers, or any other sender or receiver. The nanonetwork communication system can comprise, for example, a physical channel layer, which in turn comprises a medium through which a communication molecule is transmitted from a transmitter to a receiver. The nanonetwork communication system may also comprise an information density control layer, an interface control layer, and an environmental impact control layer.

According to an embodiment, nanonetwork communication system 800 comprises a transmitter 810 and a receiver 820. One goal of the system is to transmit information from the transmitter to the receiver in a controlled manner. The transmitter may be, for example, anything capable of transmitting a communication molecule 830. According to an embodiment, the communication molecule is $Ca^{2+}$, or any of a variety of ions, small molecules, or other elements. For example, the transmission may comprise a plurality of ions, such as $Ca^{2+}$ ions, released from a store of $Ca^{2+}$ ions. Accordingly, transmitter 810 may be or comprise a store of communication molecule 830, as depicted in FIG. 8.

According to an embodiment, nanonetwork communication system 800 comprises a physical channel layer 840. The physical channel layer is a medium through which a communication molecule is transmitted from a transmitter to a receiver. The physical channel layer 840 may be an intracellular region, an intercellular region, an artificial aqueous or semi-aqueous medium, or a variety of other media.

According to an embodiment, nanonetwork communication system 800 comprises a receiver 820. One goal of the system is to transmit information from the transmitter to the receiver in a controlled manner. The receiver may be, for example, anything capable of receiving a communication molecule 830. According to an embodiment, the receiver and/or the communication molecule is configured to specifically recognize the communication molecule. In $Ca^{2+}$ signaling, for example, $Ca^{2+}$ binding proteins such as paralbumin, calbindin, and calretinin, among others, serve the purpose of specific receivers. According to an embodiment, the receiver 820 comprises one or more communication molecule receptacles 870 configured to specifically receive and/or identify the communication molecule.

According to an embodiment, the communication molecule is transmitted from the transmitter, as shown in FIG. 8. The transmitted communication molecule travels outward from the transmitter via the physical channel layer of the nanonetwork communication system. The information communicated by the system is encoded in terms of the concentration of the communication molecule. For example, in $Ca^{2+}$ signaling the information is encoded in terms of $Ca^{2+}$ concentration and this produced $Ca^{2+}$ wave is transmitted throughout the medium from the transmitter to the receiver.

According to an embodiment, the communication molecule is transmitted in one or more bursts. For example, referring to FIG. 8, the communication molecule has been transmitted as a first burst 850 and a second burst 860. The message and/or information transmitted within the system can be controlled, established, modulated, adjusted, managed, or modified by varying the plurality of bursts. For example, as shown in FIG. 8, the concentration of the communication molecules in the second burst 860 is significantly less than in the first burst 850. Although not shown in FIG. 8, the amount of time between subsequent bursts can be varied in order to establish, control, or adjust the message and/or information transmitted within the system.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of molecular communication within a nanonetwork, the method comprising the steps of:
providing a nanonetwork communication system comprising a transmitter, a receiver, and a physical channel layer, the physical channel layer comprising a medium configured to allow a communication molecule to be transmitted from the transmitter to the receiver;
transmitting, via the physical channel layer, the communication molecule from the transmitter in a plurality of bursts, wherein information is encoded in the concentration of the communication molecule;
receiving the communication molecule by the receiver; and
varying at least one of the plurality of bursts, wherein varying the plurality of bursts modulates the information transmitted by the communication molecule, comprising the step of varying a time interval between three or more bursts.

2. The method of claim 1, wherein the communication molecule is Ca2+.

3. The method of claim 1, wherein the receiver comprises a communication molecule receptacle.

4. The method of claim 3, wherein the communication molecule receptacle is configured to recognize only the communication molecule.

5. The method of claim 3, wherein the communication molecule receptacle is a Ca2+ binding protein.

6. The method of claim 1, wherein the step of varying at least one of the plurality of bursts comprises varying an amount of communication molecule released during one or more bursts.

7. The method of claim 1, wherein the nanonetwork communication system comprises a four-layer architecture comprising the physical channel layer, an information density control layer, an interface control layer, and an environmental impact control layer.

8. The method of claim 1, wherein the transmitter comprises a store of communication molecules.

9. A molecular communication system, the system comprising:
a molecular transmitter comprising a store of communication molecules;
a molecular receiver configured to recognize the communication molecules;
a physical channel layer comprising a medium configured to allow a communication molecule to be transmitted from the transmitter to the receiver;
wherein the molecular transmitter is configured to release the communication molecule from the store in a plurality of bursts, and further wherein the molecular transmitter is configured to vary at least one of the plurality of bursts, wherein varying the plurality of bursts modulates information transmitted by the communication molecule, and wherein the molecular transmitter is further configured to vary a time interval between three or more bursts.

10. The system of claim 9, wherein the communication molecule is Ca2+.

11. The system of claim 9, wherein the receiver comprises a communication molecule receptacle.

12. The system of claim 11, wherein the communication molecule receptacle is configured to recognize only the communication molecule.

13. The system of claim 9, wherein the molecular transmitter is configured to vary an amount of communication molecule released during one or more bursts.

14. The system of claim 9, wherein the nanonetwork communication system comprises a four-layer architecture comprising the physical channel layer, an information density control layer, an interface control layer, and an environmental impact control layer.

15. A molecular communication system, the molecular communication system comprising:
a four-layer architecture comprising a physical channel layer, an information density control layer, an interface control layer, and an environmental impact control layer;
a molecular transmitter comprising a store of communication molecules; and
a molecular receiver configured to recognize the communication molecules;
wherein the physical channel layer comprises a medium configured to allow a communication molecule to be transmitted from the transmitter to the receiver;
wherein the molecular transmitter is configured to release the communication molecule from the store in a plurality of bursts, and further wherein the molecular transmitter is configured to vary at least one of the plurality of bursts, wherein varying the plurality of bursts modulates information transmitted by the communication molecule, and wherein the molecular transmitter is further configured to vary a time interval between three or more bursts.

16. The system of claim 15, wherein the receiver comprises a communication molecule receptacle.

17. The system of claim 15, wherein the molecular transmitter is configured to vary an amount of communication molecule released during one or more bursts.

* * * * *